(12) United States Patent
Armand et al.

(10) Patent No.: US 10,346,690 B2
(45) Date of Patent: Jul. 9, 2019

(54) DRIVING ASSISTANCE SYSTEMS AND METHOD IMPLEMENTED IN SUCH A SYSTEM

(71) Applicant: RENAULT s.a.s., Boulogne Billancourt (FR)

(72) Inventors: Alexandre Armand, Velizy Villacoublay (FR); Javier Ibanez-Guzman, Raizeux (FR); David Filliat, Villebon sur Seine (FR)

(73) Assignee: RENAULT s.a.s., Boulogne Billancourt (FR)

(*) Notice: Subject to any disclaimer, the term of this patent is extended or adjusted under 35 U.S.C. 154(b) by 43 days.

(21) Appl. No.: 15/501,324

(22) PCT Filed: Jul. 23, 2015

(86) PCT No.: PCT/FR2015/052028
§ 371 (c)(1),
(2) Date: Jun. 26, 2017

(87) PCT Pub. No.: WO2016/020598
PCT Pub. Date: Feb. 11, 2016

(65) Prior Publication Data
US 2017/0316272 A1 Nov. 2, 2017

(30) Foreign Application Priority Data
Aug. 6, 2014 (FR) .................................. 14 57648

(51) Int. Cl.
*B60Q 5/00* (2006.01)
*B60Q 9/00* (2006.01)
(Continued)

(52) U.S. Cl.
CPC ...... *G06K 9/00791* (2013.01); *B60K 31/0008* (2013.01); *B60Q 5/006* (2013.01);
(Continued)

(58) Field of Classification Search
CPC ......... G06K 9/00791; B60T 7/12; B60R 1/00; B60R 2300/307; B60R 2300/8093;
(Continued)

(56) References Cited

U.S. PATENT DOCUMENTS 7,363,155 B2* 4/2008 Meister .............. B60K 31/0008
340/436
2008/0065328 A1 3/2008 Eidehall et al.
(Continued)

FOREIGN PATENT DOCUMENTS

DE 10 2009 008 959 A1 9/2009
DE 10 2011 088 807 A1 6/2013
(Continued)

OTHER PUBLICATIONS

"An Intelligent Driver Assistance System (I-DAS) for Vehicle Safety Modelling using Ontology Approach", Kannan et al., International Journal of UbiComp (IJU), vol. 1, No. 3, Jul. 2010, p. 15-29. (Year: 2010).*
(Continued)

*Primary Examiner* — Brenda C Bernardi
(74) *Attorney, Agent, or Firm* — Oblon, McClelland, Maier & Neustadt, L.L.P.

(57) ABSTRACT

A driving assistance system includes at least one receiving module designed to receive perception data from a driving environment, a control module designed to control an on-board system, a conversion module designed to generate, on the basis of the perception data, a plurality of instances of classes of an ontology stored by the driving assistance system and defining relations between classes, and a reasoning tool designed to deduce, on the basis of the ontology, at least one property of an instance of the plurality. The control module is designed to control the on-board system on the basis of the deduced property.

14 Claims, 1 Drawing Sheet

(51) Int. Cl.
   *B60R 1/00*     (2006.01)
   *B60T 7/12*     (2006.01)
   *G06K 9/00*     (2006.01)
   *B60K 31/00*    (2006.01)
   *B60W 50/00*    (2006.01)
   *B60W 30/095*   (2012.01)

(52) U.S. Cl.
   CPC .............. *B60Q 9/00* (2013.01); *B60R 1/00* (2013.01); *B60T 7/12* (2013.01); *B60W 30/0953* (2013.01); *B60W 30/0956* (2013.01); *B60W 50/0097* (2013.01); *B60K 2031/0016* (2013.01); *B60R 2300/307* (2013.01); *B60R 2300/8093* (2013.01); *B60W 2550/402* (2013.01)

(58) Field of Classification Search
   CPC ...... B60Q 5/006; B60Q 9/00; B60K 31/0008; B60K 2031/0016
   See application file for complete search history.

(56) References Cited

U.S. PATENT DOCUMENTS

| | | | |
|---|---|---|---|
| 2011/0054716 A1 | 3/2011 | Stählin et al. | |
| 2012/0300072 A1* | 11/2012 | Kim | B60R 1/00 348/148 |
| 2013/0054106 A1* | 2/2013 | Schmudderich | B60W 30/0956 701/96 |
| 2013/0245941 A1 | 9/2013 | Stählin et al. | |
| 2013/0300552 A1* | 11/2013 | Chang | B60Q 9/00 340/436 |
| 2014/0222326 A1* | 8/2014 | Sato | G08G 1/166 701/301 |
| 2014/0324297 A1* | 10/2014 | Kim | B60W 10/20 701/48 |
| 2015/0025787 A1* | 1/2015 | Lehner | B60Q 1/525 701/301 |
| 2016/0144838 A1* | 5/2016 | Spencer | B60T 7/12 701/70 |

FOREIGN PATENT DOCUMENTS

| | | |
|---|---|---|
| DE | 10 2013 005 362 A1 | 10/2013 |
| EP | 1 898 232 A1 | 3/2008 |
| JP | 2004-342083 A | 12/2004 |
| JP | 2012-531340 A | 12/2012 |
| JP | 2014-041556 A | 3/2014 |
| JP | 2014-517399 A | 7/2014 |
| WO | 2014/095510 A2 | 6/2014 |

OTHER PUBLICATIONS

International Search Report dated Oct. 28, 2015 in PCT/FR2015/052028.

French Preliminary Search Report and Written Opinion dated Mar. 27, 2015 in French Patent Application No. 1457648 (with English translation of category of cited documents).

Adrian Broadhurst, et al., "Monte Carlo Road Safety Reasoning." Intelligent Vehicles Symposium, XP010834142, Jun. 2005, pp. 319-324.

* cited by examiner

DRIVING ASSISTANCE SYSTEMS AND METHOD IMPLEMENTED IN SUCH A SYSTEM

TECHNICAL FIELD TO WHICH THE INVENTION RELATES

The present invention relates in a general way to driving assistance for motor vehicles.

More particularly, it relates to a driving assistance system and a method implemented in such a system.

The invention is particularly advantageously applicable in the case in which different modules deliver data on the perception of the environment of the vehicle.

PRIOR ART

There are known driving assistance systems comprising at least one receiving module designed to receive perception data on a driving environment and a control module designed to control an on-board system, for example a visual or audible warning device, or an actuator (such as a speed controller or an emergency automatic braking system).

The control module acts on the on-board system on the basis of the received perception data, generated for example by a sensor such as a video camera.

For this purpose, provision is usually made to monitor, by means of the perception data, a specific element of the environment encountered by the vehicle; for example, in the case of emergency automatic braking systems, the distance to the next obstacle encountered by the vehicle is monitored.

OBJECT OF THE INVENTION

In this context, the present invention proposes a driving assistance system comprising at least one receiving module designed to receive perception data on a driving environment and a control module designed to control an on-board system, characterized by a conversion module designed to generate, on the basis of the perception data, a plurality of instances of classes of an ontology stored by the driving assistance system and defining relations between classes, and a reasoning tool designed to deduce, on the basis of the ontology, at least one property of an instance of said plurality, wherein the control module is designed to control the on-board system on the basis of the deduced property.

By using the ontology and the relations between classes defined in the ontology, it is possible to allow for interactions that may occur between the various objects of the driving environment, and to deduce (or predict) from these objects information that cannot be obtained by separate observation of the different objects.

Other advantageous and non-limiting characteristics of the driving assistance system according to the invention are as follows:

- the conversion module comprises a unit for the construction of a digital world comprising objects determined on the basis of the perception data, and a unit for the creation of said instances on the basis of the determined objects;
- the perception data comprise proprioceptive data transmitted by an on-board computer and/or localization data generated by a localization system and/or measurement data generated by a sensor and/or external knowledge data received from a communication system;
- the construction unit comprises a subunit for the generation of a digital horizon designed to determine at least one of said objects on the basis of the localization data and of a digital map;
- the on-board system is a warning device or an actuator.

The invention also proposes a method implemented in a driving assistance system, comprising the following steps:

- receiving perception data from a driving environment;
- generating, on the basis of the perception data, a plurality of instances of classes of an ontology stored by the driving assistance system and defining the relations between classes;
- deducing, by a reasoning tool and on the basis of the ontology, at least one property of an instance of said plurality;
- controlling an on-board system on the basis of the deduced property.

BRIEF DESCRIPTION OF THE DRAWINGS

The following description, referring to the attached drawings which are provided by way of non-limiting example, will make the nature and application of the invention clear.

In the attached drawings.

DETAILED DESCRIPTION OF AN EXEMPLARY EMBODIMENT

Figure 1:
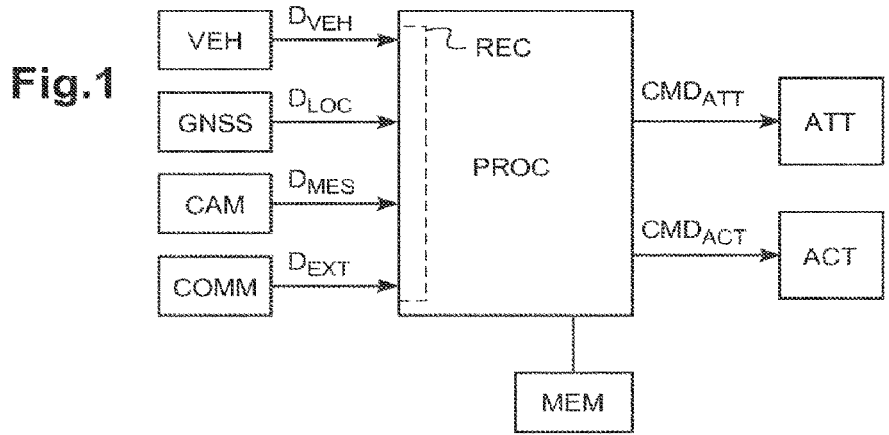
FIG. 1 shows an example of a feasible architecture for a driving assistance system according to the teachings of the invention.
Figure 4:
FIG. 4 shows schematically an example of a context in which the driving assistance system may be used.

FIG. 1 shows an example of a feasible architecture for a driving assistance system according to the teachings of the invention;

A driving assistance system of this type is installed in a motor vehicle V1 to assist the driver while he is driving in a driving environment such as that shown schematically by way of example in FIG. 4.

In the example of FIG. 1, a processor PROC performs certain functions such as those described below with reference to FIGS. 2 and 3, as a result of the execution by this processor of computer programs stored in a memory MEM associated with the processor PROC.

In practice, the processor PROC is, for example, a microprocessor, and the memory MEM may comprise a random access memory and/or a hard disk. In a variant, provision could be made to use an application specific integrated circuit (or ASIC).

The processor PROC receives, at a receiving module REC (for example a communication interface), perception data delivered by various modules fitted to the vehicle, notably:

- proprioceptive data $D_{VEH}$ (or vehicle data available on board the vehicle, for example the speed or acceleration) delivered, for example, by an on-board computer VEH,
- localization data $D_{LOC}$ delivered by a navigation system (in this case, a satellite navigation system GNSS; in a variant, it could be a GPS system, a SLAM localization system using cameras, or another system), measurement data $D_{MES}$ delivered by a sensor (in this case, a video camera CAM; in a variant, it could be a radar or laser system), and external knowledge data $D_{EXT}$ delivered by a communication system COMM (for example a vehicle to vehicle, or vehicle to architecture, wireless communication system, sometimes called V2X).

In FIG. 1, these various modules are shown as being connected at different points to the processor PROC. In practice, however, the different modules could be made to communicate with the processor PROC by means of a common mechanism, for example by means of a communication bus linking the processor PROC (i.e. its communication interface REC) with the different modules.

The driving assistance system of FIG. 1 comprises a visual and/or audible warning device ATT, for example what is known in English as a distance warning device, and an actuator ACT, for example a speed controller (or ACC, for "Automatic Cruise Control") or an emergency braking system (or AEB, for "Automatic Emergency Braking").

The processor PROC generates control signals $CMD_{ATT}$ and $CMD_{ACT}$, intended, respectively, for the warning device ATT and the actuator ACT, notably on the basis of the received perception data, according to the mechanisms described below with reference to FIGS. 2 and 3.

Figure 2:
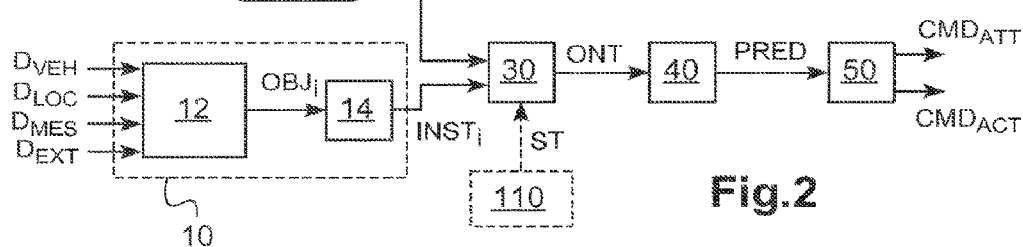
FIG. 2 shows, in the form of functional modules, the processes performed by the processor of the system of FIG. 1.

FIG. 2 shows, in the form of functional modules, the processes performed by the processor of FIG. 1.

The navigation assistance system thus comprises a conversion module 10 designed to generate, on the basis of the aforementioned perception data, instances of classes defined in an ontology stored in the navigation assistance system, for example in the memory MEM. The ontology is, for example, written in the format known as OWL (for "Ontology Web Language").

The classes are representations of the different types of object that may be encountered in the driving environment where the vehicle is maneuvering, for example vehicles, vulnerable elements (pedestrians, animals, bicycles, etc.) and road infrastructure (intersections, stop signs, pedestrian crossings, etc.).

In the ontology, each class may be characterized by at least one property (or more if required) describing an action or a behavior of the object concerned, for example the "slow down" property for the class associated with the object "vehicle" or the "cross over" property for the class associated with the object "pedestrian".

The ontology defines relations between the different classes, for example by means of rules which define these relations when certain conditions are met. For example, a vehicle brakes on approaching a stop and halts at the stop, or a pedestrian near a pedestrian crossing is likely to cross the road, or a vehicle slows down when a pedestrian is likely to cross the road.

In this case, the "basic ontology", identified by 20 in FIG. 2, is designated as the definition of the classes and of the relations between classes; this definition provides a conceptual description of the driving environment (objects and events that may be found in such a driving environment), without application to any particular driving context.

The conversion module 10 comprises, for example, a unit for constructing a digital world on the basis of perception data $D_{VEH}$, $D_{LOC}$, $D_{MES}$, $D_{EXT}$ described above. The digital world is a data structure which represents the set of the objects $OBJ_i$ perceived by the vehicle on the basis of the perception data $D_{VEH}$, $D_{LOC}$, $D_{MES}$, $D_{EXT}$. In practice, the digital world is, for example, defined by a list of the perceived objects $OBJ_i$ and by the characteristics of these objects (for example their location in space).

As shown schematically in FIG. 4, these objects are, for example, a pedestrian P (detected, for example, by the measurement data $D_{MES}$ obtained from the camera CAM), a pedestrian crossing C (known from the localization data $D_{LOC}$ and a stored digital map 120, as explained below with reference to FIG. 3) and a vehicle V2 (located in front of the vehicle V1 fitted with the driving assistance system, and known from the measurement data $D_{MES}$ and/or external knowledge data $D_{EXT}$ received, for example, from the vehicle V2).

An example of a construction unit 12 is described below with reference to FIG. 3.

The conversion module 10 also comprises a unit 14 for creating instances $INST_i$ corresponding, respectively, to the objects $OBJ_i$ of the digital world.

More precisely, for each object $OBJ_i$ of the digital world, the creation unit 14 creates an instance $INST_i$ of the class (in the ontology) associated with the type of object concerned. The class instance $INST_i$ created in this way has properties defined on the basis of the characteristics of the object $OBJ_i$ in the digital world (for example, properties of position, speed, etc.).

Thus, in the aforesaid example, an instance $INST_P$ of the "pedestrian" class, an instance $INST_C$ of the "pedestrian crossing" class, and an instance $INST_{V2}$ of the "vehicle" class are created.

The instances $INST_i$ generated at the output of the conversion module 10 are associated with the basic ontology 20 (stored, for example, in the memory MEM) by means of an association module 30, which may thus deliver a completed ontology ONT modeling the driving environment perceived by the vehicle V1 fitted with the driving assistance system.

As shown in broken lines in FIG. 2, the completed ontology ONT may further include information on the state ST of the vehicle V1 fitted with the driving assistance system (information produced by a subunit 110 for generating the vehicle state, described below with reference to FIG. 3).

A reasoning tool 40, or reasoner, is then applied to the completed ontology ONT, in order to deduce from the ontology implicit properties of some class instances $INST_i$, which also makes it possible to predict some of these properties PRED. For example, a Pellet, or Fact++, or Racer, or Hermit reasoner is used.

In the example used above, the reasoner applies the aforementioned rules ("a pedestrian near a pedestrian crossing is likely to cross the road" and "a vehicle slows down when a pedestrian is likely to cross the road") to the created instances $INST_P$, $INST_C$, $INST_{V2}$, and deduces from this that the V2 will (probably) slow down.

A control module 50 receives the properties (notably the predicted properties) deduced PRED by the reasoning tool 40, and generates the control information $CMD_{ATT}$, $CMD_{ACT}$, allowing for these deduced properties PRED.

More precisely, the control module 50 may use mechanisms conventionally used in driver assistance systems to generate the control signals $CMD_{ATT}$, $CMD_{ACT}$, adding thereto the allowance for the deduced information PRED.

In a variant, the control module may be made to hold more information on the state of the objects than the list of instances of classes present in the ontology.

Here, if the actuator ACT is a speed controller, the speed of the vehicle V1 fitted with the speed controller is, for example, controlled by a conventional mechanism on the basis of the speed of the vehicle V2 as detected by means of a sensor, for example the camera CAM. However, if the control module 50 receives the predicted property PRED indicating that the vehicle V2 is going to slow down, the control module 50 sends a control signal $CMD_{ACT}$ to the speed controller, in order to adapt the speed of the vehicle V1 (fitted with the speed controller) to the predicted slowing of the vehicle V2, even before the vehicle V2 actually slows down.

Similarly, if the actuator ATT is an excess speed warning device, the threshold of activation of the warning device ATT (the speed beyond which a light signal or audible signal is transmitted by the warning device ATT) may be set by a conventional mechanism on the basis of the speed of the vehicle V2 as detected by means of a sensor, for example the camera CAM. However, if the control module 50 receives the predicted property PRED indicating that the vehicle V2 is going to slow down, the control module 50 sends a control signal $CMD_{ATT}$ to the warning device ATT in order to reduce the threshold of activation of the warning device ATT.

Figure 3:
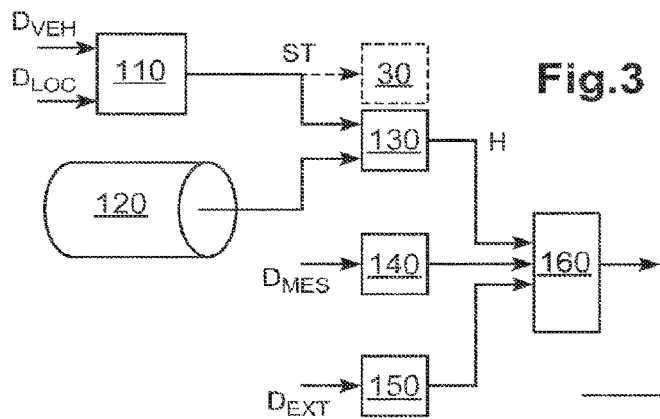
FIG. 3 shows in detail one of the modules of FIG. 2.

FIG. 3 shows a feasible exemplary embodiment of the construction unit 12.

In this example, the construction unit 12 comprises the subunit 110 for generating the state ST of the vehicle V1 (as mentioned above). This generation subunit 100 receives at its input the proprioceptive data $D_{VEH}$ (for example the speed of the vehicle V1) and the localization data $D_{LOC}$, enabling different state variables ST of the vehicle V1 to be determined at the output.

The construction unit 12 also comprises a subunit 130 for generating the electronic horizon H, which uses the state ST of the vehicle V1 received from the generation subunit 110 and a digital map 120 (stored, for example, in the memory MEM) in order to generate the electronic horizon H of the vehicle V1.

The electronic horizon H is formed by a set of information extracted from the digital map 120 and relating to the environment (notably the roads) in which the vehicle V1 is likely to maneuver in the near future, that is to say, in practice, the information from the digital map 120 at a distance below a specified threshold (which may be adjustable), for example 500 m.

In a variant, instead of using a distance threshold (500 m), it would be possible to use a time threshold (for example 15 seconds), which would have the advantage of adapting the amount of information to be processed to the speed of the vehicle.

The electronic horizon H therefore contains objects $OBJ_i$ (for example the pedestrian crossing C) which will form part of the digital world produced by the construction unit 12, as explained above.

The construction unit 12 comprises a subunit 140 for processing the measurement data $D_{MES}$, which detects objects $OBJ_i$ (for example the pedestrian P) by interpreting these measurement data $D_{MES}$ (obtained, in the case of the pedestrian P, from the aforementioned camera CAM).

The construction unit 12 comprises a subunit 150 for analyzing external knowledge data $D_{EXT}$, which determines the existence and the characteristics (notably the localization) of certain objects $OBJ_i$ (for example the vehicle V2), by analyzing these external knowledge data $D_{EXT}$ (the vehicle V2 communicating its location, for example, via the communication system COMM).

Finally, the construction unit 12 comprises an association subunit 160, which groups together the objects $OBJ_i$ signaled by the subunits 130, 140, 150 (in the form of a list, for example, as indicated above) in order to form the digital world supplied at the output of the construction unit 12.

The invention claimed is:

1. A driving assistance system for a vehicle, comprising:
   at least one receiving module designed to receive perception data from a driving environment of the vehicle;
   a control module designed to control an on-board system of the vehicle;
   a conversion module designed to:
      identify objects based on the perception data;
      generating an electronic horizon for the vehicle from a digital map, the electronic horizon being limited to a portion of the digital map over which the vehicle will maneuver in a predetermined time;
      classify, on the basis of the perception data, each of the objects into one of a plurality of classes of an ontology stored by the driving assistance system, the ontology defining relations between the classes based on rules that define the relations when predetermined criteria are met;
      construct a digital world comprising the objects within the electronic horizon;
      create an instance for each of the objects in the digital world based on the ontology; and
   a reasoning tool designed to deduce, on the basis of the ontology, at least one property of one of the instances, wherein the control module is designed to control the on-board system on the basis of the deduced property.

2. The driving assistance system as claimed in claim 1, wherein the perception data comprise proprioceptive data transmitted by an on-board computer.

3. The driving assistance system as claimed in claim 1, wherein the perception data comprise localization data generated by a localization system.

4. The driving assistance system as claimed in claim 1, wherein the perception data comprise localization data generated by a localization system, and wherein the conversion module comprises a subunit for the generation of the electronic horizon.

5. The driving assistance system as claimed in claim 1, wherein the perception data comprise measurement data generated by a sensor.

6. The driving assistance system as claimed in claim 1, wherein the perception data comprise external knowledge data received from a communication system.

7. The driving assistance system as claimed in claim 1, wherein the on-board system is a warning device.

8. The driving assistance system as claimed in claim 1, wherein the on-board system is an actuator.

9. The driving assistance system as claimed in claim 1, wherein the digital world comprises each of the objects and a location of each of the objects in space.

10. The driving assistance system as claimed in claim 1, wherein the objects include a pedestrian, a first vehicle that includes the driving assistance system, a second vehicle, and a pedestrian crossing.

11. The driving assistance system as claimed in claim 1, wherein the ontology defines the relations between the classes based on rules that are applied when the objects possess predetermined conditions.

12. The driving assistance system as claimed in claim 11, wherein the reasoning tool deduces the at least one property based on the rules that are applied.

13. The driving assistance system as claimed in claim 12, wherein the objects include a pedestrian, a first vehicle that includes the driving assistance system, a second vehicle, and a pedestrian crossing, and the rules include, based on the objects, that the pedestrian near the pedestrian crossing is likely to cross a road and that the second vehicle slows down when the pedestrian is likely to cross the road.

14. A method implemented in a driving assistance system of a vehicle, comprising:
   receiving perception data from a driving environment of the vehicle;
   identifying objects within the driving environment based on the perception data;
   generating an electronic horizon for the vehicle from a digital map, the electronic horizon being limited to a portion of the digital map over which the vehicle will maneuver in a predetermined time;
   classifying, on the basis of the perception data, each of the objects into one of a plurality of classes of an ontology stored by the driving assistance system, the ontology defining relations between the classes based on rules that define the relations when predetermined criteria are met;
   constructing a digital world comprising the objects within the electronic horizon;
   creating an instance for each of the objects based on the ontology;
   deducing, by a reasoning tool and on the basis of the ontology, at least one property of one of the instances; and
   controlling an on-board system on the basis of the deduced property.

* * * * *